United States Patent [19]
Galles et al.

[11] Patent Number: 5,669,008
[45] Date of Patent: Sep. 16, 1997

[54] HIERARCHICAL FAT HYPERCUBE ARCHITECTURE FOR PARALLEL PROCESSING SYSTEMS

[75] Inventors: Michael B. Galles, Los Altos; Daniel E. Lenoski, San Jose, both of Calif.

[73] Assignee: Silicon Graphics, Inc., Mountain View, Calif.

[21] Appl. No.: 435,451

[22] Filed: May 5, 1995

[51] Int. Cl.$^6$ .................................................. G06F 15/80
[52] U.S. Cl. ........................................ 395/800.12; 395/311
[58] Field of Search ........................................ 395/800, 311

[56] References Cited

U.S. PATENT DOCUMENTS

| | | | |
|---|---|---|---|
| 4,868,818 | 9/1989 | Madan | 371/11.3 |
| 5,105,424 | 4/1992 | Flaig | 370/94.1 |
| 5,301,104 | 4/1994 | Yalamanchili | 395/800 |
| 5,313,645 | 5/1994 | Rolfe | 395/800 |
| 5,471,580 | 11/1995 | Fujiwara | 395/200.02 |
| 5,488,735 | 1/1996 | Tanabe | 395/800 |
| 5,546,596 | 8/1996 | Geist | 395/200.02 |
| 5,581,767 | 12/1996 | Katsuki | 395/800 |
| 5,594,918 | 1/1997 | Knowles | 395/800 |

OTHER PUBLICATIONS

Goodman, J. et al., "Hypertree: A Multiprocessor Interconnection Topology," *IEEE Transactions On Computers*, vol. C-30, No. 12, Dec. 1981, pp. 923–933.

Bhuyan, L. et al., "Generalized Hypercube And Hyperbus Structures For A Computer Network," *IEEE Transactions On Computers*, vol. C-33, No. 4, Apr. 1984, pp. 323–333.

Kumar, J. et al., "Extended Hypercube: A Hierarchical Interconnection Network Of Hypercubes," *IEEE Transactions On Parrallel And Distributed Systems*, vol. 3, No. 1, Jan. 1992, pp. 45–57.

Louri, A. et al., "Scalable Optical Hypercube-Based Interconnection Network For Massively Parallel Computing," *Applied Optics*, vol. 33, No. 32, 10 Nov. 1994, pp. 7588–7598.

Malluhi, Q. et al., "The Hierarchical Hypercube: A New Interconnection Topology For Massively Parallel Systems," *IEEE Transactions On Parallel And Distributed Systems*, vol. 5, No. 1, Jan. 1994, pp. 17–30.

Tzeng, N.-F. et al., "Enhanced Hypercubes," *IEEE Transactions On Computers*, vol. 40, No. 3, Mar. 1991, pp. 284–294.

*Primary Examiner*—Eric Coleman
*Attorney, Agent, or Firm*—Sterne, Kessler, Goldstein & Fox P.L.L.C.

[57] ABSTRACT

A hierarchical fat hypercube topology provides an infrastructure for implementing a multi-processor system at a plurality of levels. A first level is comprised of a plurality of n-dimensional hypercubes. This plurality of n-dimensional hypercubes is interconnected at a second level utilizing an m-dimensional metacube. The number of dimensions at each level and the number of bristles at each level can be customized depending on the requirements of the application. Additionally, routers can be implemented such that the system can be expanded to meet increasing system requirements. This is particularly useful at the second level of the hierarchical topology.

16 Claims, 7 Drawing Sheets

PRIOR ART

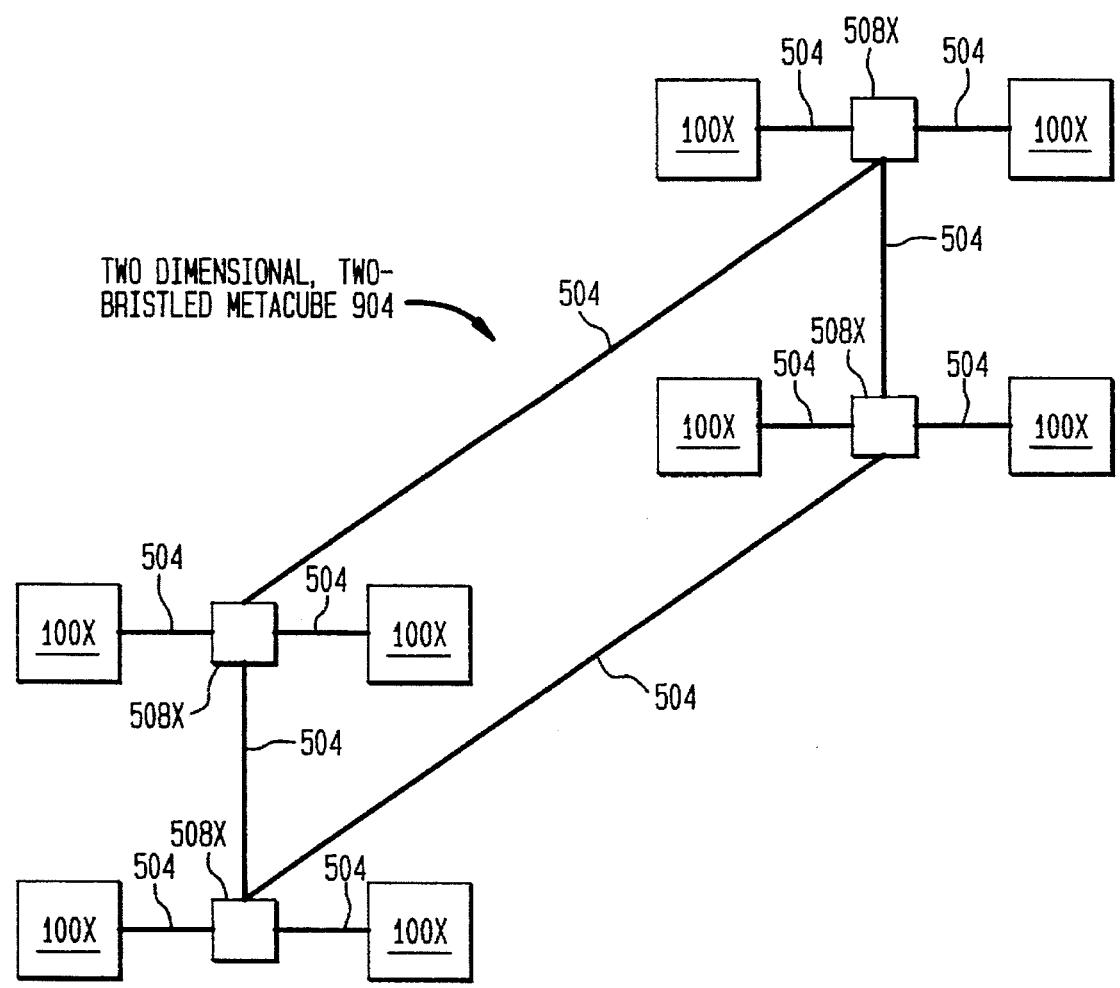

HIERARCHICAL FAT HYPERCUBE ARCHITECTURE FOR PARALLEL PROCESSING SYSTEMS

RELATED APPLICATIONS

This application is related to two commonly owned applications filed on even date herewith: a first entitled "System and Method for Network Exploration and Access in A Multiprocessor Environment", Ser. No. 08/435,456, and a second entitled "Programmable, Distributed Network Routing" and having Ser. No. 08/435,452. The full disclosure of each of these applications is incorporated herein by reference as if reproduced in full below.

BACKGROUND OF THE INVENTION

1. Field of the Invention

The present invention is directed toward a hypercube topology, and more specifically, to a hierarchical fat hypercube topology for connection of processing nodes and input/output (I/O) nodes in a multi-processor environment. The topology according to the present invention provides expandability, scalable bisection bandwidth, redundant paths between node pairs, and a low network diameter.

2. Related Art

Recent advances in VLSI Technology have led to the evolution of a processing environment in which large numbers of processors can be implemented in massively parallel computing systems. A cardinal element that dictates the performance of such a massively parallel computing system is the infrastructure that supports communications among the various processors. In fact, given contemporary design criteria such as high computational bandwidth and increased parallelism, the level of communications required among processors is increasing dramatically.

Several different topologies have been proposed to interconnect the various processors in such environments. Among these topologies are rings, stars, meshes and hypercubes. Regardless of the topology chosen, design goals include a high communications bandwidth, a low inter-node distance, a high network bisection bandwidth, and a high degree of fault tolerance.

Inter-node distance is defined as the number of communications links required to connect one node to another node in the network. Topologies are typically specified in terms of the maximum inter-node distance: the shortest distance between two nodes that are farthest apart on the network. The maximum inter-node distance is also referred to as network diameter.

Bisection bandwidth is defined as the number of links that would be severed if the network were to be bisected by a plane at a place where the number of links between the two halves is a minimum. In other words, bisection bandwidth is the number of links connecting two halves of the network where the halves are chosen as the two halves connected by the fewest number of links. It is this worst-case bandwidth which can potentially limit system throughput and cause bottlenecks. Therefore, it is a goal of network topologies to maximize bisection bandwidth.

In this document, bisection bandwidth is often described in terms of the number of nodes in the network. This enables comparison of the relative bisection bandwidths of networks of various sizes. For a network having k nodes, bisection bandwidth is defined in terms of the number of nodes as $x*k$. For example, as described below, a conventional hypercube has a bisection bandwidth of $(\frac{1}{2})k$. This bisection bandwidth remains constant (relative to the number of nodes) at $k/2$ regardless of the dimension of the conventional hypercube.

Note that it may be more appropriate to define bisection bandwidth as the number of communications links times the bandwidth of each link. However, assuming a constant bandwidth/link regardless of the topology, relative bisection bandwidth comparisons among the topologies can simply be addressed in terms of the number of links. Therefore, as a matter of convention, bisection bandwidth is defined in this document in terms of the number of communications links.

One multi-processor architecture that meets these design criteria and is well suited to applications requiring a large number of processors is the hypercube. A conventional hypercube topology is now described. In a hypercube network, a plurality of microprocessors are arranged in an n-dimensional cube where the number of nodes k in the network is equal to $2^n$. In this network, each node is connected to each other node via a plurality of communications paths. The network diameter, the longest communications path from any one node on the network to any other node, is n-links.

FIGS. 1A, 1B, 1C, and 1D illustrate 1, 2, 3, and 4 dimensional hypercubes, respectively. Referring now to FIGS. 1A–1D, the hypercube comprises a plurality of nodes 102 connected to one another via edges 104 (i.e links). As stated above, each n-dimensional hypercube has a plurality of nodes, where the number of nodes k is equal to $2^n$. For example, the 4-dimensional hypercube, illustrated in FIG. D as a tesseract, has 24, or 16, nodes 102. Each node is connected to n=4 other nodes 102 (i.e., each node 102 is connected to n edges 104), and the longest path between any two nodes 102 is n=4 links (edges 104).

One feature of the conventional hypercube is that the maximum distance between any two nodes (i.e., the diameter) in a hypercube having k nodes is given by $\log_2(k)$. Thus, even as the number of nodes increases, the maximum distance between any two nodes only increases as $\log_2$. As a result, the number of nodes, and hence the number of processors or I/O ports, can be doubled while only requiring a unitary increase in the network diameter between any two nodes. Thus, for each increase in the dimension of the topology (i.e., to expand from an n-dimensional to an (n+1)-dimensional hypercube), an additional edge 104 must be connected to each node 102. Thus, it is axiomatic that to increase the dimension of a hypercube 100, each node must have an additional port to support the additional connection. As a result, as the dimension of the hypercube increases the number of ports in each node increases as well.

Another advantage of the conventional hypercube is a high bisection bandwidth. As stated above, bisection bandwidth is defined as the number of edges that connect two halves of the network when the network is bisected at the weakest point. With a conventional hypercube, the bisection bandwidth always remains constant at $k/2$, for a hypercube having k nodes.

Several extensions or variations of the conventional hypercube have been proposed and/or implemented in multi-processor systems. One such variation, presented in *Scalable optical hypercube-based interconnection network for massively parallel computing*, by Loud, et at., Applied Optics, Vol. 33, No. 32, 10 Nov. 1994, pp 7588–7598, is the multi-mesh hypercube. One disadvantage of the multi-mesh hypercube over the conventional hypercube is a large network diameter. For a multi-mesh hypercube made up of an l×m array of n-dimensional hypercubes, the maximum distance is ((l–1)+(m–)+n). A second disadvantage of the multi-mesh hypercube topology is a low bisection bandwidth relative to the number of nodes in the network. For a symmetrical mesh (where l=m), the bisection bandwidth is k/4, where k is the number of nodes.

A second variation on the conventional hypercube is presented in *The Hierarchical Hypercube: A New Interconnection Topology for Massively Parallel Systems*, by Malluhi, et al., IEEE Transactions on Parallel and Distributed Systems, vol. 5, No. 1, January 1994, pp. 17–30. According to Malluhi, each of the nodes of an n-dimensional hypercube is itself an n-dimensional hypercube. This topology has two disadvantages over the conventional hypercube: a lower bisection bandwidth and a greater maximum distance for the same number of nodes.

Consider for example a three-dimensional hierarchical hypercube according to Malluhi, where each node is itself a three-dimensional hypercube (i.e., n=3, n'=3). In such a network, there are 64 nodes, and the bisection bandwidth is 4 edges, or k/16. Contrast this to the conventional hypercube having 64 nodes with a bisection bandwidth of 32 edges, or k/2. Also, Malluhi's hierarchical hypercube has a maximum diameter of (n+2n'), which, for the n=3 and n'=3 network of the current example yields a maximum diameter of nine edges. For a conventional 64-node hypercube, the maximum diameter is $\log_2(64)$=six edges.

A third variation of the conventional hypercube is presented in *Extended Hypercube: A Interconnection Network of Hypercubes*, by Kumar et al., IEEE Transactions on Parallel and Distributed Systems, vol. 3, no. 1, 1 Jan. 1992, pp. 45–57. According to this extended hypercube topology, network commanders (NC's) are used to connect a plurality of n-dimensional hypercubes. There are $2^n$ nodes at each n-dimensional hypercube at the first level, one n-dimensional cube of NC's at the second level, and one NC at the third level.

Thus, according to the extended hypercube topology, each node of an n-dimensional hypercube at one level of hierarchy is connected to a single communication processor at the next level of hierarchy. A plurality of n-dimensional hypercubes, each having an NC are connected via the NC's. One disadvantage of this is that each NC provides a single point of failure for its respective hypercube. If the NC fails, the entire hypercube is severed from the network. Another disadvantage is that apparently additionally processing capabilities are needed at the NC nodes. It does not appear that conventional routers can be used to implement the NC. Furthermore, each NC requires a large number of edge connections.

Conventional hypercube topology is a very powerful topology that meets many of the system design criteria. However, when used in large systems, the conventional hypercube has some practical limitations. One such limitation is the degree of fanout required for large numbers of processors. As the degree of the hypercube increases, the fanout required for each node increases. As a result, each node becomes costly and requires larger amounts of silicon to implement.

The variations on the basic hypercube topology, as noted above, each have their own drawbacks, depending on the size of the network. Some of these topologies suffer from a large network diameter, while others suffer from a low bisection bandwidth. What is needed is a topology that is well suited to applications requiring a large number of processors; is scalable; and provides a high bisection bandwidth, a wide communications bandwidth, and a low network diameter.

SUMMARY OF THE INVENTION

The present invention is directed toward a hierarchical fat hypercube topology that provides a novel and unique approach to implementing multiprocessor systems in a scalable and cost-effective manner. According to this hierarchical topology, two or more levels of hierarchy are provided. The first level utilizes conventional n-dimensional hypercube topologies for implementing a multi-processor infrastructure. Each of these n-dimensional hypercubes are interconnected at a second level which can be one of p dimensions. Note that p can, but does not have to, equal n. Thus, according to the hierarchical fat hypercube topology, additional processing nodes can be added to the infrastructure without increasing the dimension of the infrastructure as was done with the conventional hypercubes.

The hierarchical hypercube topology can be implemented such that the bisection bandwidth scales linearly with the number of nodes in the topology. In other words, the bisection bandwidth per node remains constant regardless of the number of nodes in the network. Although this feature is found in the conventional basic hypercube, it is not present in many of the proposed variations thereto.

A further advantage of the invention is that by using the second level to interconnect additional n-dimensional hypercubes, significant increases in the number of processing nodes can be realized without having to increase the number of ports required on each router. As is described below, the network can be expanded by adding additional first-level n-dimensional hypercubes to available router ports on existing metalevel nodes (metanodes) or by adding additional metanodes at the metalevel and adding n-dimensional hypercubes to these additional metanodes.

An additional advantage is that, spare router ports at the second level can remain free for future expansion of the network to include additional nodes. Because the routers can be implemented using a fewer number of ports per node than was possible with conventional topologies, the routers are more cost effective and more efficient to implement.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 1, which comprises

FIGS. 9A and 9B illustrate two alternative embodiments for a hierarchical fat hypercube network having eight n-dimensional hypercubes.

DETAILED DESCRIPTION OF THE EMBODIMENTS

1. Overview and Discussion of the Invention

The present invention is directed toward a hierarchical fat hypercube topology for connection of processing nodes and/or I/O nodes in a multiprocessor environment. In such a multi-processor environment, there exists a plurality of nodes, each connected to one another by a plurality of communications links. Each node can include one or more processing elements, such as microprocessors. Each node can also include local memory and/or I/O ports for communications outside of the network.

The present invention is a novel and non-obvious expansion of the conventional hypercube technology. The unique topology of the invention provides a foundation for a multi-processor system that can be readily scaled to meet increasing processing demands. Such scaling can be accomplished without disadvantages found in conventional hypercube topologies and known variations thereto. As is fully discussed below, by utilizing the hierarchical fat hypercube topology, the network can support a large number of nodes while maintaining a high bisection bandwidth. Additionally, an increase in the number of processing nodes can be accomplished without a significant increase in node connections or in network diameter.

2.0 Environment of the Invention

As stated above, each conventional hypercube comprises a plurality of nodes 102 connected to one another via edges 104. The complexity of nodes 102 can vary depending on the application of the multi-processor system. In its simplest form, each node is a microprocessor functioning as a computing engine in the multi-processor system. In more complex environments, each node can support multiple processors and/or I/O functionality. These same concepts hold true for the nodes of a hierarchical fat hypercube topology.

Figure 2:
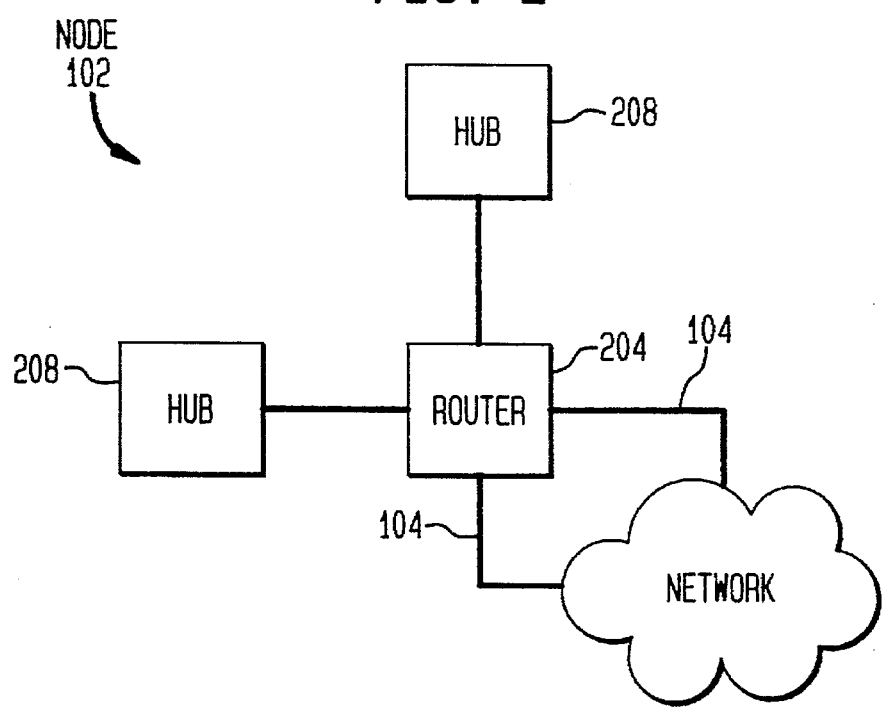
FIG. 2 is a block diagram illustrating an example configuration of a node that can be used in a multi-processor network. The node illustrated in FIG. 2 is a two-bristled node in that it includes two hubs.
Figure 3:
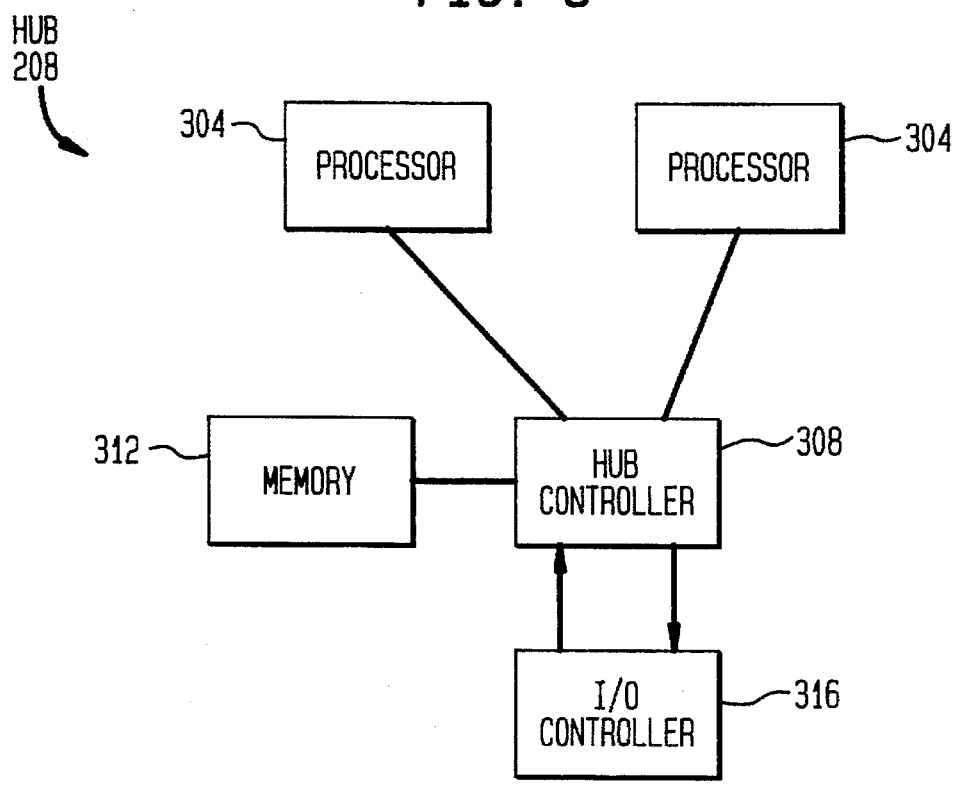
FIG. 3 is a block diagram illustrating an example architecture for a hub in a network node.

The hierarchical fat hypercube topology according to the present invention is described in terms of an example environment wherein each node is configured as illustrated in FIGS. 2 and 3. This section of the patent document describes this example environment.

One example of a relatively complex node architecture is illustrated in FIG. 2. According to this environment, each node comprises a router 204 and one or more hubs 208. Router 204 makes the appropriate connections between other nodes 102 of the network via edges 104 and the one or more hubs 208. Each hub 208 can include one or more processors and/or I/O devices.

Note that if a node 102 includes one hub, it is said to be one bristled. If a node 102 has two hubs 208, it is said to be two bristled, and so on. Further note that if the node illustrated in FIG. 2 is implemented in a 4-dimensional hypercube, router 204 would have to be a six-port router: one port for each of the four edges 104 and one port for each of the two hubs 208.

FIG. 3 is a diagram illustrating an example architecture of a hub 208. Hub 208 comprises one or more processors 304, a controller 308, memory 312 and an I/O controller 316. Although any of numerous processors can be chosen for processor 304, in one environment processor 304 is a superscalar RISC processor such as the T5 (R10K) MIPS processor, available from Silicon Graphics, Inc., California, USA.

Hub controller 308 controls access to the resources of hub 208 by other hubs 208 on the network. Memory 312 provides local memory to the processors 304 and can also be shared among processors across the network and with I/O devices connected to this or other nodes 102. I/O controller 316 provides a network interface to one or more I/O devices.

As stated above, the present invention is described in terms of this example environment as described with reference to FIGS. 2 and 3. Description in these terms is provided for convenience only. It is not intended that hierarchical fat hypercube according to the invention be limited to application in this example environment. In fact, after reading the following description, it will become apparent to a person skilled in the relevant art how to implement the invention in alternative environments using alternative node 102 and/or hub 204 configurations. To a large extent, the topology according to the present invention is independent of the complexity of the nodes 102 within that topology.

3.0 Hierarchical Fat Hypercube Topology

The hierarchical fat hypercube topology according to the invention is now generally described. According to the topology, a hierarchy is implemented in which there are at least two levels. A first level is comprised of two or more n-dimensional hypercubes, each hypercube having $2^n$ nodes 102, and each node having n edges 104 connected thereto. Each node also has an additional edge that connects the node to the second level.

The second level is a p-dimensional hypercube, referred to as a metacube. The metacube has $2^p$ nodes connected together using edges in a manner similar to the typical hypercube topology. However, as described below, the number of routers per node and the number of edges between each node pair in the metacube is scaled according to the dimension of the first-level hypercubes. This is in contrast to the conventional hypercube which has only a single edge between each node pair.

Each node of the metacube is comprised of a plurality of routers. This plurality of routers is referred to as a router block. The number of routers in each router block is equal to the number of nodes in a first-level hypercube (i.e., there are $2^n$ routers per router block). Similarly there are $2^n$ edges between each node pair (between each pair of router blocks) in the metacube.

The metacube provides the interconnections between the plurality of first-level hypercubes. Each first-level hypercube is connected to a node of the metacube. The node of the metacube to which a hypercube is connected is said to be that hypercube's associated node. In the preferred embodiment, there is one n-dimensional hypercube of the first level connected to each node of the metacube. Therefore, the metacube is referred to as a one-bristled metacube. As is described in more detail below, providing a one-bristled second level allows the bisection bandwidth to scale proportionally with the number of nodes (i.e., to remain constant in terms of the number of nodes in the network).

Each node of a first-level hypercube is connected to a router in the router block using an edge. Thus, between each first-level hypercube and its associated node are $2^n$ edges.

Thus, the hierarchical fat hypercube is unlike conventional hypercube topologies which have either a single multi-dimensional hypercube or which have a plurality of n-dimensional hypercubes connected directly to one another using a mesh or one or more edges therebetween. Instead, in the hierarchical fat hypercube, the n-dimensional hypercubes are connected together using the p-dimensional metacube. The use of the p-dimensional metacube allows a high communications bandwidth, a constant bisection bandwidth relative to the number of nodes, a low network diameter, and a scalable implementation.

The n-dimensional hypercube (or p-dimensional metacube) can be described and illustrated as an n-dimensional (or p-dimensional) 'cube' having a node at each vertex. Thus, a two-dimensional hypercube (or metacube) can be described and illustrated as a 'rectangle' having $2^2$=four nodes, one at each vertex. Similarly, the three-dimensional hypercube (or metacube) as a 'cube' having eight nodes, one at each vertex; the four-dimensional hypercube (or metacube) as a 'tessarect' having 16 nodes, one at each vertex; and so on. Note that while these topologies are described in terms of specific geometric shapes, (e.g., square, rectangle, etc.) this does not mandate a specific spatial orientation or placement of the nodes and edges. As is understood by a person skilled in the relevant art of hypercube topologies, description in these terms is merely provided to facilitate an understanding of the manner in which nodes can be connected. The relative spatial placement of nodes in the network and the routing of edges is not constrained in any way by this geometric definition.

The hierarchical fat hypercube is now further described with reference to a few specific example topologies. The first topology is an extremely simple 16-node topology which is described and contrasted with the four-dimensional conventional hypercube which also has 16 nodes.

Figure 1A:
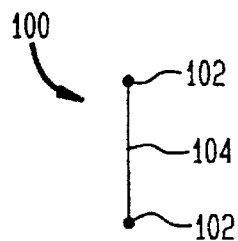
FIGS. 1A, 1B, 1C, 1D, is a diagram illustrating a one dimensional hypercube, a two dimensional hypercube, a three dimensional hypercube, and a four dimensional hypercube as a tessarect, respectively.
Figure 1B:
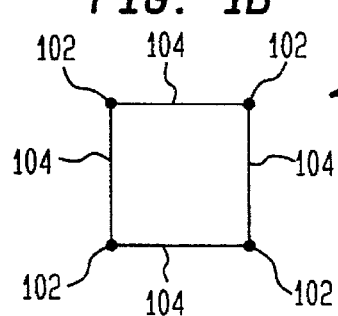
Figure 1C:
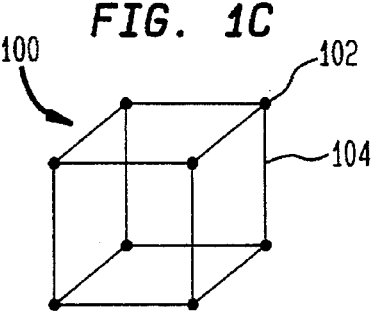
Figure 1D:
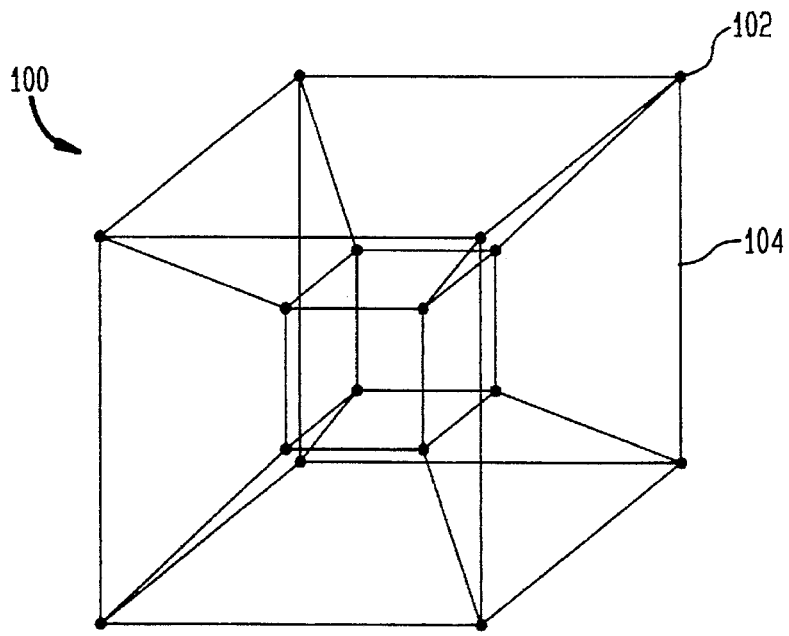
Figure 4:
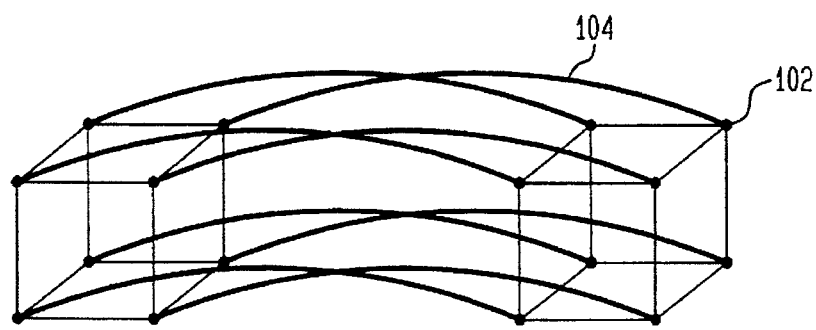
FIG. 4 is a diagram illustrating a conventional 16-node hypercube illustrated as two three-dimensional hypercubes.

To facilitate this description, an alternative illustration of the conventional four-dimensional hypercube is first described. FIG. 4 is a diagram providing an alternative illustration of the conventional four-dimensional hypercube that is illustrated in FIG. 1D. Referring to FIG. 4, in this conventional four-dimensional hypercube topology, each node 102 of a three-dimensional hypercube is directly connected via an edge 104 to a corresponding node of a second three-dimensional hypercube.

Having thus briefly described the conventional four-dimensional hypercube, the differentiation between this conventional topology and the hierarchical fat hypercube topology of the present invention can be more clearly defined. Such description and differentiation is first provided in terms of an extremely simple 16-node network.

According to the invention, a hierarchy is implemented to provide a manageable technique for handling an increase in the number of nodes in a multi-processor system. Instead of simply expanding the dimension of the hypercube, as was done in conventional systems, the present invention adds another level to the topology, thus providing a hierarchical topology.

Figure 5:
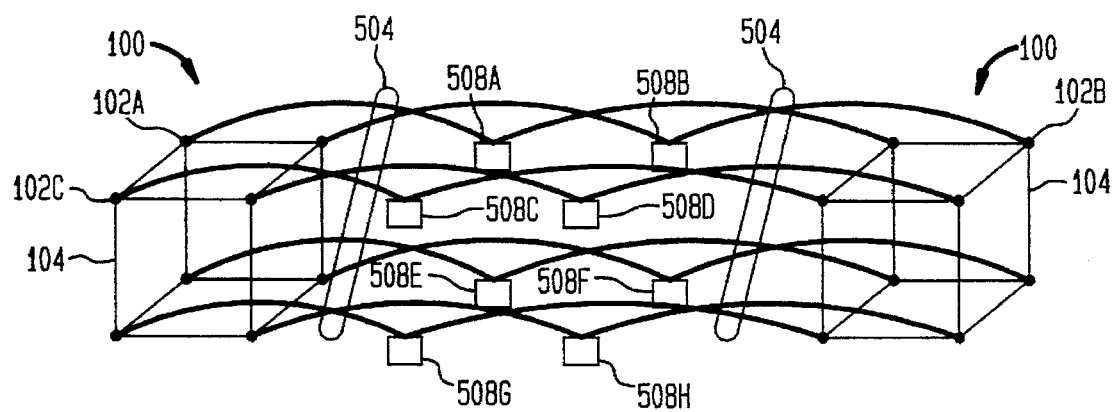
FIG. 5 is a diagram illustrating a 16-node network configured according to one embodiment of the hierarchical fat hypercube topology of the invention.

FIG. 5 is a diagram illustrating the manner in which the equivalent of a four-dimensional hypercube is implemented using the hierarchical fat hypercube topology. The topology illustrated in FIG. 5, is capable of supporting the same number of nodes 102 as was supported by the four-dimensional topology illustrated in FIG. 4.

Referring now to FIG. 5, one embodiment of a hierarchical fat hypercube topology having 16 nodes 102 is illustrated. In this embodiment, two three-dimensional hypercubes ($2^3$=8 nodes each) are interconnected to form an infrastructure supporting a total of 16 nodes. According to the invention, however, the manner in which the two three-dimensional hypercubes are interconnected is quite different from the conventional 16-node topology illustrated in FIGS. 1D and 4.

According to the invention, each node 102 of one three-dimensional hypercube is connected to the corresponding node 102 of the second three-dimensional hypercube via a router 508. This is in contrast to the conventional four-dimensional hypercube topology where each node of one three-dimensional hypercube is directly connected to a corresponding node of the second three-dimensional hypercube.

Thus, to obtain, for example, the equivalent of an (n+1)-dimensional hypercube using two n-dimensional hypercubes, the corresponding nodes of the n-dimensional hypercubes are not simply directly connected together. Instead, they are connected using additional routers 508. It should be noted, that in one embodiment, routers 508 can be implemented using devices identical to routers 204. In fact, to simplify system design and fabrication, this is the case in the preferred embodiment.

Inherent in this hierarchical fat hypercube topology is the concept of multiple levels. According to the embodiment illustrated in FIG. 5, the hierarchical fat hypercube topology has two levels. The first level is a three-dimensional level comprised of the two, individual three-dimensional hypercubes. The second level, the metalevel, is a p-dimensional metacube comprised of routers 508. In the embodiment illustrated in FIG. 5, the metacube is zero-dimensional (i.e., p=0).

When the topology is implemented for a small network, such as the 16-node network illustrated in FIG. 5, there is a disadvantage over the conventional topology illustrated in FIG. 4. This disadvantage is that the hierarchical topology requires the addition of routers 508 to make the interconnects between the n-dimensional hypercubes of the first level. Thus, to interconnect the same number of nodes (and therefore the same number of network resources) additional hardware is required. Because of this disadvantage, it may be undesirable to implement a simple 16-node system using this topology. However, one advantage of the hierarchical fat hypercube is it's expandability. Because of this expandability aspect (described below), it may be advantageous to implement a simple 16-node system as illustrated in FIG. 5 where the system is likely to be expanded in the future.

As briefly stated above, one advantage of the hierarchical fat hypercube is that it is easily expandable. That is, if the network is implemented using the hierarchical fat hypercube topology, the system is expandable to include additional nodes without having to change the routers 204, 508 of the initial network. For example, consider an implementation that uses six-ported routers 204 (i.e., each router 204 having six ports) at each node. With the conventional topology illustrated in FIG. 4, if two hubs are connected to each node (i.e., a two-bristled system), along with the four edges 104 required for the four-dimensional topology, there are no available, unused ports on routers 204. Thus, in its present configuration, that conventional hypercube could not be expanded to a include additional nodes 102.

Figure 7:
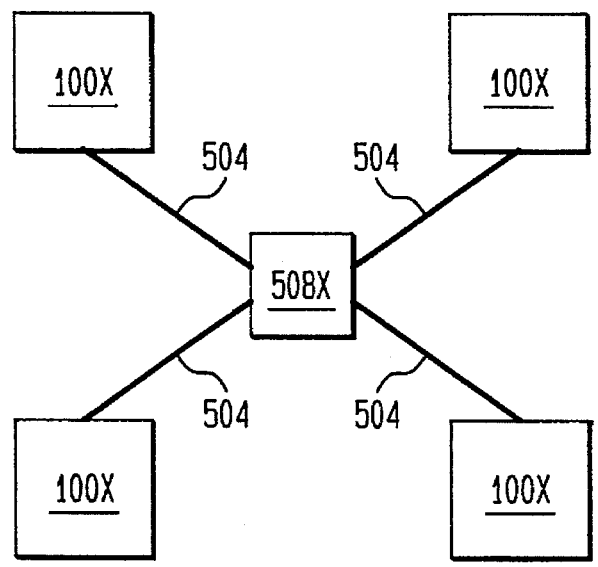
FIG. 7 is a diagram illustrating in the alternative drawing convention a hierarchical fat hypercube network having four n-dimensional hypercubes at a first level connected to a zero-dimensional, four-bristled metacube at the second level.

However, given the same six-ported routers to implement the routers 204 and routers 508 in the topology illustrated in FIG. 5, routers 508 have additional ports to which additional network connections can be made. Thus, additional hypercubes can be connected to this topology via these available ports on routers 508. Examples of this sealability aspect are illustrated in FIGS. 7, 8, and 9 which are discussed in more detail below. As a specific example, FIG. 7 illustrates the network of FIG. 5 with two additional n-dimensional hypercubes attached to the metalevel. In this expanded form, the number of nodes (and hence the number of processors) is doubled as compared to the network illustrated in FIG. 4. The embodiment illustrated in FIG. 7 is described in greater detail below.

A further aspect of the expandability of the hierarchical fat hypercube topology is that it allows additional nodes to be added without requiring an increase in the number of edges connected to each first-level node 102. Remember that for the conventional hypercube, a increase in dimension of the hypercube from n to n+1 results in a unitary increase in the number of edges connected to each node. With the hierarchical fat hypercube, once the second level is added, additional nodes can be added without requiring additional connections to the first level. Note that such expansion is made while also maintaining a constant bisection bandwidth relative to the number of nodes in the network.

4.0 Drawing Convention

Figure 6:
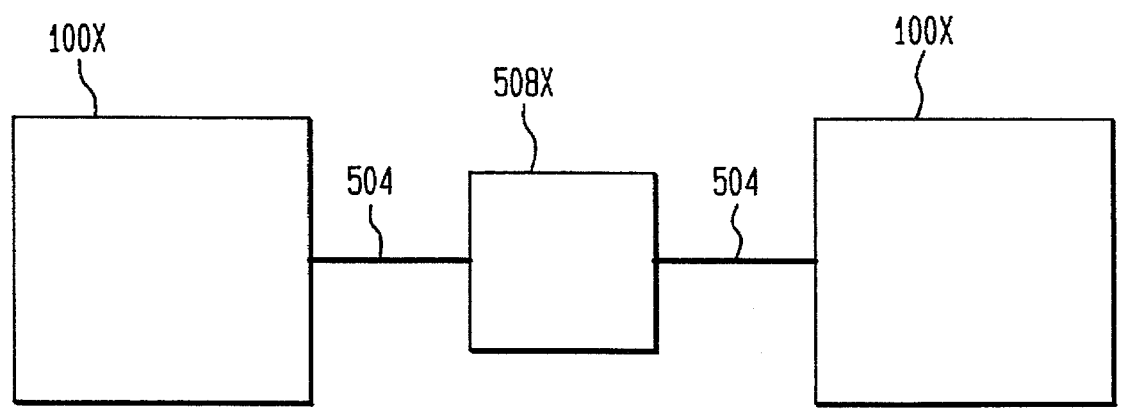
FIG. 6 is a block diagram illustrating an alternative drawing convention for the network depicted in FIG. 5.

FIG. 6 is a diagram illustrating an alternative way of depicting the hierarchical topology as illustrated in FIG. 5. This alternative drawing convention is adopted to simplify the drawings so that they can be more readily understood. This alternative drawing convention is now described. The drawing and the description are made so as to describe the convention in terms of the embodiment illustrated in FIG. 5. After reading this description, it will become apparent to a person skilled in the relevant art, how to adopt this convention for alternative embodiments.

Referring now to FIG. 6, according to this alternative convention, a single router block 508X is drawn to illustrate the collective grouping of all the routers 508 implemented to interconnect the two hypercubes 100. Similarly, a single line labeled 504 is used to illustrate the plurality of edges between routers 508 (i.e., router block 508X) and the hypercube. Additionally, the hypercube is illustrated as a 'black box' 100X to illustrate that it can be of any dimension.

Casting this description specifically in terms of FIG. 5, hypercubes 100X each represent the three-dimensional hypercubes of that topology. The router block 508X is the single node ($2^0$=1) of the zero-dimensional metacube that makes up the second level of the hierarchical fat hypercube network. Router block 508X is comprised of the individual routers 508A–508H used to interconnect the individual nodes of the three-dimensional hypercubes via the edges 504. Further note that routers 508A–508H can be implemented using routers 204 identical to those used in nodes 102. This drawing convention is used throughout the remainder of this patent document to simplify the drawings and to more clearly illustrate the described embodiments of the hierarchical fat hypercube.

5.0 Additional Embodiments of the Hierarchical Fat Hypercube

This section illustrates a few of the alternative networks that can be implemented using the hierarchical fat hypercube topology of the present invention. For each of these drawings, the first level of the hierarchical topology is illustrated with a "black box" 100X to illustrate an n-dimensional hypercube 100 of any dimension. Additionally, it is important to note that this first level could itself be implemented using a hierarchical topology.

Note that for the hierarchical fat hypercube topology, the number of edges 504 used to connect each first-level n-dimensional hypercube to the second level metacube is equal to $2^n$, (i.e., one per node). Similarly, the number of routers 508 required to make this connection is $2^n$ as well. This feature provides a high communications bandwidth.

FIG. 7 illustrates an embodiment of the hierarchical fat hypercube topology where the first level is an n-dimensional hypercube 100X, and the second level is a zero-dimensional metacube. According to this embodiment, four n-dimensional hypercubes 100X are interconnected using a single-node, zero dimensional metacube that is comprised of router block 508X.

For the specific example described above where router 508 has six ports, this particular embodiment can easily be modified to interconnect anywhere from two–six n-dimensional hypercubes 100X via a zero-dimensional metacube at the second level. In fact, as briefly noted above, the topology illustrated in FIG. 7 is a simple expansion of the topology illustrated in FIG. 5, where two additional n-dimensional hypercubes 100X have been added via router block 508X.

As a result of this expansion, the number of nodes 102 in the network can be doubled without having to increase the number of ports in routers 204. The only cost is the addition of $2^n$ routers 508 at the metalevel.

Figure 8A:
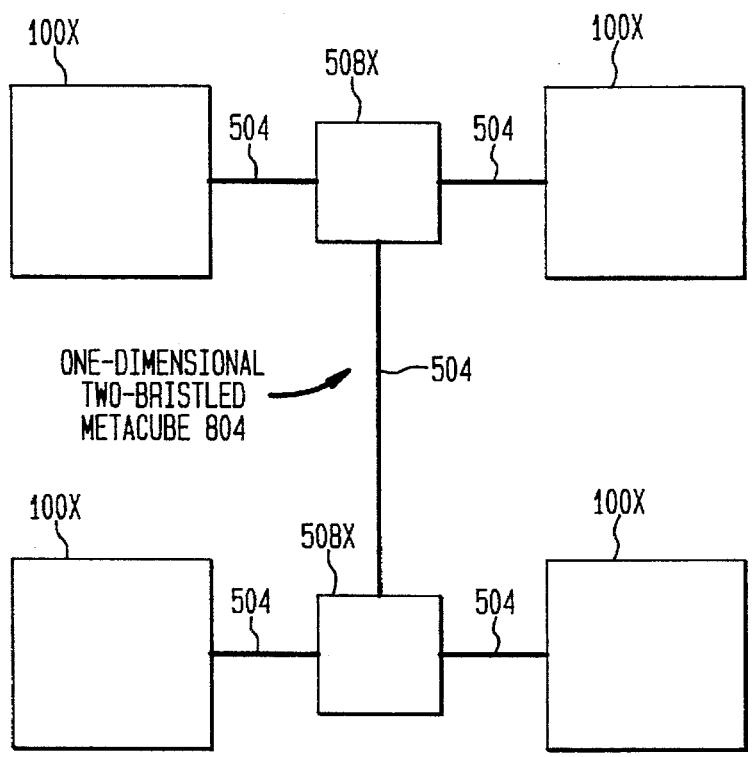
FIGS. 8A and 8B illustrate two alternative embodiments for a hierarchical fat hypercube network having four n-dimensional hypercubes.

FIG. 8A is a diagram illustrating yet another embodiment of the hierarchical topology. In this embodiment, the second level is a one-dimensional, two-bristled metacube 804. In this embodiment, metacube 804 has 2 nodes comprised of router blocks 508X. Again, sealability can be accomplished by utilizing additional router ports within the routers 508. These additional ports can be utilized to connect to additional n-dimensional hypercubes 100X to the metanodes. Note that such an expansion results in an increase in the bristling of this level. For example, adding an additional n-dimensional hypercube 100X to each router block 508X results in the metalevel metacube 804 being three-bristled. As described below, this diminishes the bisection bandwidth relative to the number of nodes in the network (i.e., the bisection bandwidth does not scale proportionally with the number of nodes).

Another way to expand the network is to connect to additional router blocks at the metalevel to support additional n-dimensional hypercubes 100X. FIG. 9A, described in detail below, illustrates an example of such expansion.

Figure 8B:
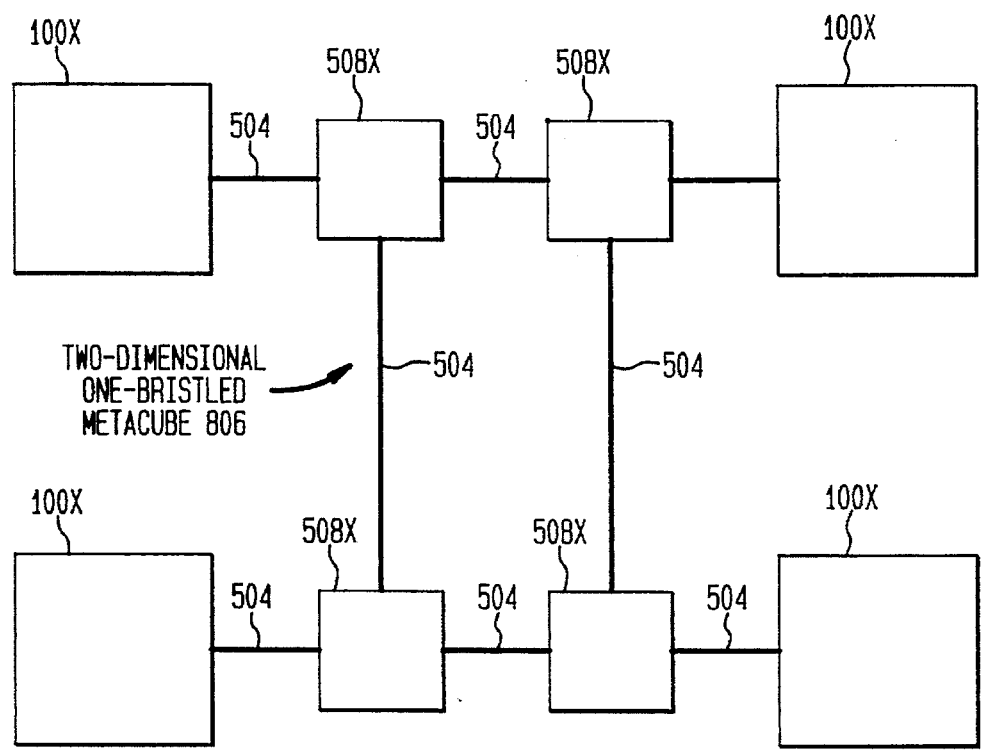

FIG. 8B illustrates an implementation of the network of FIG. 8A, but with a two-dimensional, one-bristled metacube 806. To achieve this topology from that illustrated in FIG. 8A, two router blocks 508X, comprising n routers 508 each, and three sets of n edges 504 are added. The advantage obtained by this additional hardware is an increased bisection bandwidth.

The metacube 804 of the network illustrated in FIG. 8A is a one-dimensional, two-bristled implementation of the topology illustrated in FIG. 7. The network has k=($2^n$* 4) nodes. Because metacube 804 is two-bristled; the bisection bandwidth is k/4. Contrast this to the network in FIG. 8B which implements the metalevel as a two-dimensional, one-bristled metacube 806 where the bisection bandwidth is k/2. This simple example serves to illustrate why, according to the preferred embodiment, the second level is implemented as a one-bristled level.

Thus, when implementing a network using the hierarchical fat hypercube topology, a tradeoff can be made between the bristling factor and the bisection bandwidth. When comparing FIGS. 8A and 8B it is easy to see that by adding additional router blocks 508X at the metalevel so that metacube 806 remains one-bristled the bisection bandwidth relative to the number of nodes 102 remains at k/2. Alternatively, the additional router blocks 508X can be omitted at the cost of decreasing bisection bandwidth below k/2.

Note that where the second level is zero dimensional (e.g., FIGS. 6 and 7) the bristling factor of the second level does not affect the bisection bandwidth. This is because the metalevel is effectively a 'point' defined by a single router block 508X. Each router 204, 508 in router bock 508X has a crossbar which cross-connects each of the router ports. The crossbar links are the links severed when the network is bisected. Thus, for the zero-dimensional metalevel, the bisection bandwidth remains proportional to the number of nodes regardless of the bristling factor.

FIG. 9A is a diagram illustrating an embodiment of the hierarchical fat hypercube topology wherein the second level is a two-dimensional two-bristled metacube 904. In the specific embodiment illustrated in FIG. 9, there are eight n-dimensional hypercubes 100X at the first level. The total number of nodes in the network is k=($2^n$* 8). The n-dimensional hypercubes 100X are connected by four router blocks 508X as illustrated.

Again, as with the other embodiments, sealability is accomplished by adding onto the network at router blocks 508X. For example, a duplicate of the network can be connected to the existing network by connecting the corresponding router blocks 508X. This would result in a two-bristled, three dimensional metalevel illustrated as metacube 904. (a two-bristled version of the embodiment illustrated in FIG. 9B).

Figure 9B:
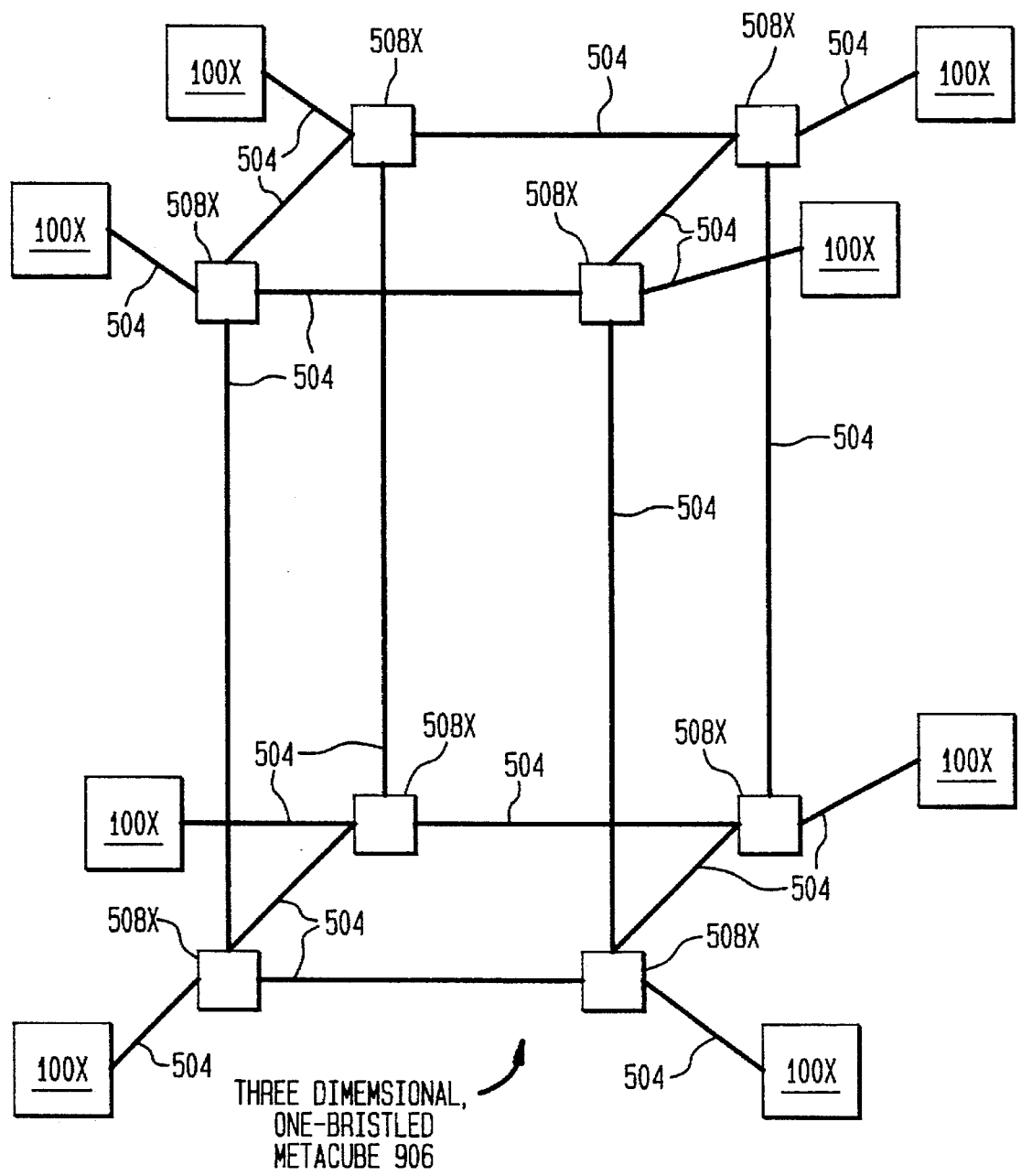

Note that, as is the case with the topology illustrated in FIG. 8, the two-bristled second level illustrated in FIG. 9A results in a bisection bandwidth of k/4. Thus, it may be preferable to add additional router blocks 508X to the network to implement a one-bristled metalevel and maintain a bisection bandwidth of k/2. Such a one-bristled embodiment is illustrated in FIG. 9B.

In the embodiment illustrated in FIG. 9B, the second level is a three-dimensional, one-bristled metacube 906. Note that the bisection bandwidth in this topology is k/2. Compare this to the topology illustrated in FIG. 9A where the bisection bandwidth is k/4. Thus, by maintaining the second level as a one-bristled level, the bisection bandwidth can be maintained at k/2 at a cost of additional routers and edges.

Note also that the network illustrated in FIG. 9B is an expanded version of that illustrated in FIG. 8B to achieve such expansion, the network of FIG. 8B is duplicated and the two networks are connected at the corresponding router blocks 508X. Further note that the network illustrated in FIG. 9B could have its number of nodes (n-dimensional hypercubes 100X) doubled in at least two ways. The easiest way to double the network is to make the three-dimensional metalevel two bristled. This doubles the number of nodes, but decreases the bisection bandwidth in relation to the number of nodes.

A second way is to make the metalevel a four-dimensional (tessarect), one bristled metacube having 16 n-dimensional hypercubes as nodes. This is accomplished by duplicating the network and connecting the corresponding router blocks 508X of the two networks.

Further note that this four-dimensional metalevel could further be made two bristled so that there are 32 n-dimensional hypercubes 100X. Of course, such expansion would result in a decreased bisection bandwidth relative to the number of nodes.

Note that for each of the embodiments, including those embodiments not disclosed herein, the dimension of the first level and the metalevel can be expanded as one- or two-bristled cubes to meet processing requirements. Additional levels of bristling can be added as well. Note that each level decreases the bisection bandwidth relative to the number of nodes.

Further note that each embodiment disclosed herein is simply an expansion of the basic embodiment illustrated in FIG. 5. The changed factors are the dimension of the metalevel and the bristling factor.

It is interesting to view these networks in terms of some example numbers. For the network illustrated in FIG. 9B, assume that the first level is comprised of four-dimensional hypercubes. The total number of nodes k is 8*$2^4$=128. The bisection bandwidth is (24 edges * 4 edge sets)=64 edges =k/2. Note that the maximum network diameter is n+m+2=9 and the maximum cable length is constrained due to the intermediate routers 508 at the metalevel. Also note that for networks where nodes 102 have two hubs 208 with two processors each, the number of processors is 512.

After reading the above description, it should become apparent to a person skilled in the relevant art how various additional alternative embodiments of the hierarchical topology can be implemented having an n-dimensional first level and an p-dimensional second level, wherein n and p are integers, and further, wherein n and p can, but need not, be the equal. It should also become apparent to a person skilled in the relevant art that a third level could also be added to the hierarchical fat hypercube topology to further take advantage of the hierarchical structure.

6.0 Additional Advantages of the Hierarchical Fat Hypercube

One advantage of the hierarchical fat hypercube over conventional networks is that large numbers of processors can be interconnected while confining the number of router ports to a practical level. With conventional hypercubes, each additional dimension requires an additional router port. This is not the case with hierarchical fat hypercube topology. With the hierarchical fat hypercube topology, an entire second level of the hierarchy can be added using a single additional router port at the nodes of the first level. The added second level can then be used to support the additional processors and I/O ports for the system.

To illustrate this point, it is helpful to refer again to FIG. 9B. Assume for the purposes of this discussion that the hypercubes 100X in the first level are three-dimensional. Also assume that the hypercubes 100X are two bristled in that each node 102 has two hubs 208. In this example, there are k=64 nodes. To implement this network, each first-level router 204 would require six ports: three for the first-level edges 104, two for the hubs 208 (one each), and one to connect to the corresponding metalevel router 508. At the metalevel, only four ports are required for each router 508. Therefore, these routers 508 can be implemented using the six-ported routers 204 with the remaining two ports as spares (which are available for future expansion). Thus the network could be implemented using six-ported routers 204. The total number of routers would be 128:64 at the metalevel and 64 at the first level.

Because there are two spare ports at the metalevel, the dimension of the metalevel can be increased from three to five, without having to change routers 204,508. The additional dimensions can simply be 'plugged into' the existing network, providing the ability to quadruple the number of nodes and, therefore, to quadruple the number of processors, while maintaining six-ported routers.

In contrast, if the same 64-node system were to be implemented using a conventional hypercube, the hypercube would be a six-dimensional hypercube. If these hypercubes 100 are also two-bristled, each node 102 would also have two hubs 208. Thus, for the conventional implementation, each router 204 would require eight ports: six for the edges 104 and two for the hubs 208. Further, if such eight-ported routers are used, there is no room for expansion, the system is confined to a 64-node network, unless the routers 204 are replaced. Thus, although only 64 routers are needed, this apparent savings comes at the cost of foregoing expandability. For example, consider an expansion to 256 nodes. To make such an expansion in a conventional system, the hypercube would have to be expanded to eight dimensions. This would require a change in routers 204 from eight-ported routers 204 to ten-ported routers 204.

Although some of the variations to the conventional hypercube described in the background may not require additional network connections, the hierarchical fat hypercube has advantages over these systems as well. To illustrate these, consider again the topology of FIG. 9B where the hypercubes 100 in the first level are three-dimensional hypercubes. In this example, the topology has 64 nodes. The worst-case bisection bandwidth is k/2 and the maximum diameter is p+n+2=eight.

If, in contrast, the 64 nodes were implemented as a conventional 4×2 mesh of three dimensional hypercubes, the worst-case bisection bandwidth would be k/4.

An additional advantage of the hierarchical fat hypercube topologies is a modularity achieved in cabling. Because each n-dimensional hypercube at the first level connects to a p-dimensional hypercube at the second level and the p-dimensional hypercube routes the data from one n-dimensional hypercube to another, long cabling runs can be avoided. This is because each node 102 in each first-level n-dimensional hypercube is only connected to n other nodes in the immediate n-dimensional hypercube and to a metanode at the second level. There are no direct connections from one node 102 in one n-dimensional hypercube to another node 102 in a different n-dimensional hypercube. Such connection is made only via the metalevel. Therefore, a group of nodes 102 (and hence processors) (i.e., where each group is an n-dimensional hypercube) can be spaced remotely from other groups of nodes 102 and because the interconnection between the two groups is by the metalevel, cabling lengths between the remotely spaced nodes 102 can be manageable. As a result, the communications bandwidth of the cable is not limited by length. This advantage is especially useful in large systems.

4. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A hierarchical fat hypercube topology for a multi-processor network, comprising:

a first level comprising a plurality of n-dimensional hypercubes, each said n-dimensional hypercube comprising $2^n$ first-level nodes; and a second level comprising a p-dimensional metacube, wherein said metacube comprises $2^p$ second-level nodes, said one or more second-level nodes each comprising 2 routers for interconnecting said first-level nodes of said first-level n-dimensional hypercubes;

wherein each said n-dimensional hypercube of said first level is connected to a corresponding second-level node of said metacube via $2^n$ edges;

wherein said $2^n$ routers are not connected together with edges.

2. The hierarchical fat hypercube topology according to claim 1, wherein said $2^n$ edges connecting an n-dimensional hypercube of said first level to a corresponding second-level node of said metacube each connect one of said first-level nodes of said n-dimensional hypercube to one of said $2^n$ routers of said second-level node.

3. The hierarchical fat hypercube topology according to claim 1, wherein said second nodes of said metacube are connected together as a p-dimensional network, wherein specified node pairs are connected together using $2^n$ edges such that there is one edge for each pair of routers in a specified node pair.

4. The hierarchical fat hypercube topology according to claim 1, wherein there is no more than one n-dimensional hypercube of said first level connected to each second node of said metacube.

5. The hierarchical fat hypercube topology according to claim 1, wherein there are two or more n-dimensional hypercubes of said first level connected to each said node of said metacube.

6. The hierarchical fat hypercube topology according to claim 1, wherein said first-level nodes each comprise a router and one or more hubs, wherein said routers at said first-level nodes comprise ports for connecting to said hubs and for connecting to said routers at other said first-level and said second-level nodes.

7. The hierarchical fat hypercube topology according to claim 6, wherein said hubs comprise one or more processors.

8. The hierarchical fat hypercube topology according to claim 6, wherein said routers at said first-level nodes comprise an identical number of ports as said routers at said second-level nodes.

9. The hierarchical fat hypercube topology according to claim 6, wherein said hubs comprise memory and/or I/O controllers.

10. A hierarchical fat hypercube topology for a multi-processor network, comprising:

a first level comprising a plurality of n-dimensional hypercubes, each said n-dimensional hypercube comprising $2^n$ first-level nodes, wherein each said first-level node is connected to n other first-level nodes using n first edges;

a second level comprising a p-dimensional metacube, wherein said metacube comprises $2^p$ second-level nodes, wherein each said second-level node comprises $2^n$ routers and wherein each said second-level node is connected to p other second-level nodes using $p2^n$ second edges; and a plurality of third edges for connecting each said n-dimensional hypercube of said first level to one of said second-level nodes, wherein each node of each said n-dimensional hypercube is connected to one of said $2^n$ routers in one of said second-level nodes;

wherein said $2^n$ routers are not connected together with edges.

11. The hierarchical fat hypercube topology according to claim 10, wherein there is a no more than one n-dimensional hypercube of said first level connected to each second node of said metacube.

12. The hierarchical fat hypercube topology according to claim 10, wherein there are two n-dimensional hypercubes of said first level connected to each said node of said metacube.

13. The hierarchical fat hypercube topology according to claim 10, wherein said first-level nodes each comprise a router and one or more hubs, wherein said routers at said first-level nodes comprise ports for connecting to said hubs and for connecting to said routers at other said first-level and said second-level nodes.

14. The hierarchical fat hypercube topology according to claim 13, wherein said hubs comprise one or more processors.

15. The hierarchical fat hypercube topology according to claim 13, wherein said routers at said first-level nodes comprise an identical number of ports as said routers at said second-level nodes.

16. The hierarchical fat hypercube topology according to claim 13, wherein said hubs comprise memory and/or I/O controllers.

* * * * *

UNITED STATES PATENT AND TRADEMARK OFFICE
CERTIFICATE OF CORRECTION

PATENT NO. : 5,669,008
DATED : September 16, 1997
INVENTOR(S) : Galles *et al.*

It is certified that error appears in the above-identified patent and that said Letters Patent is hereby corrected as shown below:

At Column 13, line 45, please replace "2" with --2"--;

line 50, please replace ":" with --;-- ; and

At Column 14, line 42, please delete "a".

Signed and Sealed this

Twentieth Day of January, 1998

Attest:

BRUCE LEHMAN

*Attesting Officer*       *Commissioner of Patents and Trademarks*